Oct. 11, 1927.
A. G. CASH
SURFACE TEST INDICATOR
Filed Jan. 17, 1927
1,645,473
Fig. 1
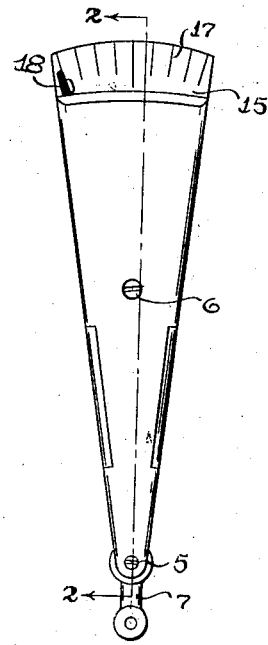
Fig. 2
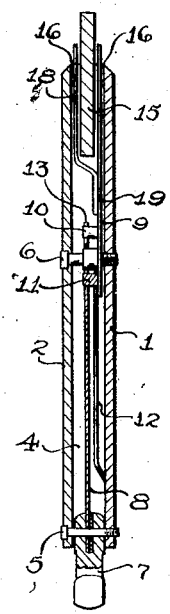
Fig. 3
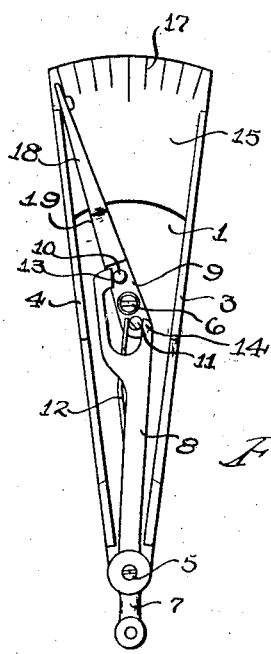
Fig. 4
INVENTOR
Alfred G. Cash
BY
his ATTORNEY Patented Oct. 11, 1927.

1,645,473

UNITED STATES PATENT OFFICE.

ALFRED G. CASH, OF ROCHESTER, NEW YORK.

SURFACE TEST INDICATOR.

Application filed January 17, 1927. Serial No. 161,535.

The present invention relates to surface test indicators and an object thereof is to provide a simple and inexpensive construction in which the indicator is capable of giving a reading from either of two sides thereof.

To this and other ends the invention consists of certain parts, and combinations of parts all of which will be hereinafter described; the novel features being pointed out in the appended claim.

In the drawings:

Fig. 1 is a face view of the indicator from one side thereof.

Fig. 2 is a section on the line 2—2, Fig. 1.

Fig. 3 is an interior view showing the cover plate removed, and

Fig. 4 is a fragmentary view of the indicating member.

In the embodiment of the invention herein illustrated there is employed a casing comprising two side plates 1 and 2 connected by end walls 3 and 4, the side plate 2 being held in position by two screws 5 and 6. The screw 5 forms a bearing for the contact element 7 which is mounted to turn on the screw and which has a frictional engagement with the pivoted operating arm 8. Mounted to turn on the pivot screw 6 is an indicating member 9 which has two projections 10 and 11 on opposite sides of the pivot and which through a spring 12 is held in the position shown in Fig. 3. The projection 10 is engaged by an arm 13 on the operating arm 8 while the projection 11 is engaged by an arm 14 on the operating arm 8. If the contact member 7 is engaged on the right hand side Fig. 3, then the arm 13 will shift the indicating member 9 to the right or clockwise whereas if the contact 7 is engaged on the left hand side then the arm 14 will engage the projection 11 and shift the indicating member 9 also to the right or clockwise. A surface test indicator such as that described hereinbefore has been known for some years.

The feature of this invention is the construction of the indicator so that a reading may be obtained from either side or face of the indicator. This result is secured by the provision of an indicating plate 15, which connects the end walls 3 and 4 above the pivot of the indicating member 9 and which projects beyond the ends of both side walls 1 and 2 in spaced relation to such side walls to provide spaces 16 on opposite sides of the plate 15. This indicating plate has suitably marked graduations 17 on opposite sides thereof beyond the side walls 1 and 2.

In order that the indicating member 9 may cooperate with both indications or graduations said indicating member 9 is provided with two spaced fingers 18, connected at 19 in any suitable manner below the indicating plate 15, these fingers 18 operating on opposite sides of the plate 15 and in the spaces 16.

From the foregoing it will be seen that the results of the test may be read on the indicating plate 15 from either side of the instrument. The instrument as a whole is simple in construction and it is inexpensive to manufacture.

What I claim as my invention and desire to secure by Letters Patent is:

A surface test indicator comprising, a casing having two side walls, and two end walls connecting the side walls; a contact member mounted between the two side walls at one end of the casing, an indicating plate connecting the end walls at the opposite end of the casing, spaced from the side walls and projecting beyond both side walls, the projecting portion having graduations on opposite sides thereof, an indicating member pivotally mounted within the casing and having two pointers operating on opposite sides of the indicating plate, and means connecting the indicating member with the contact member.

ALFRED G. CASH.